Sept. 23, 1969   G. STCHERBATCHEFF   3,469,133
ELECTRIC MOTOR WITH A BRIDGE-TYPE MAGNETIC CIRCUIT
Filed Oct. 13, 1965   5 Sheets-Sheet 1

Inventor
Georges Stcherbatcheff
By Cushman, Darby & Cushman
Attorneys

Sept. 23, 1969     G. STCHERBATCHEFF     3,469,133
ELECTRIC MOTOR WITH A BRIDGE-TYPE MAGNETIC CIRCUIT
Filed Oct. 13, 1965     5 Sheets-Sheet 5
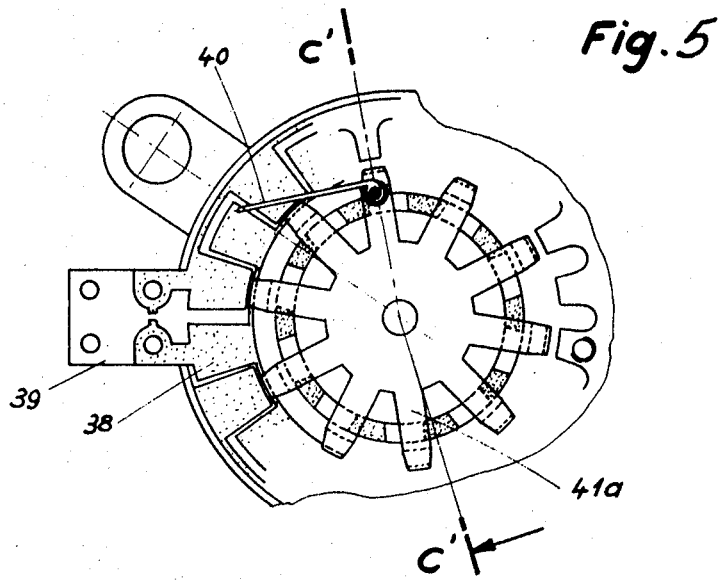
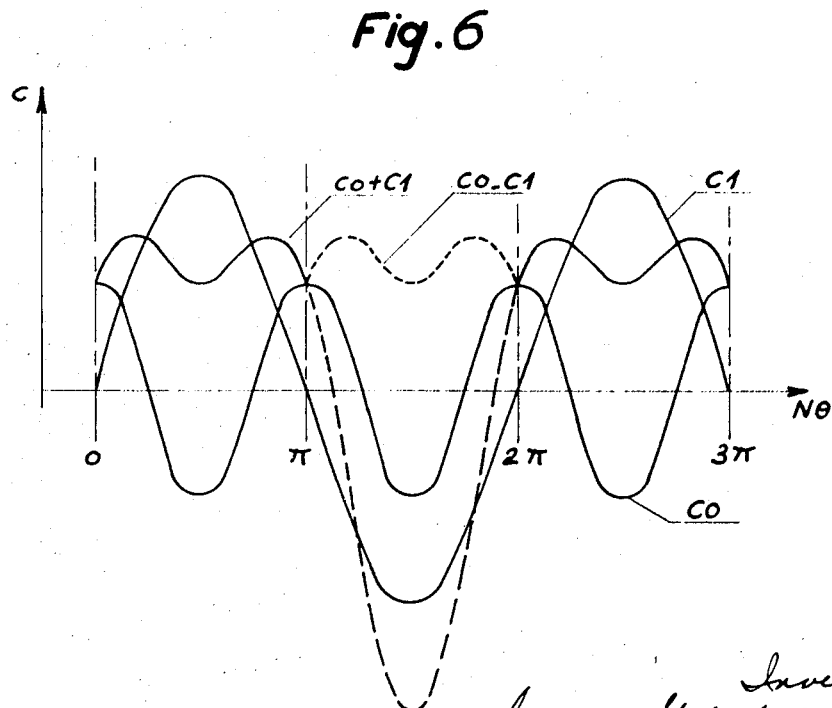

Sept. 23, 1969    G. STCHERBATCHEFF    3,469,133
ELECTRIC MOTOR WITH A BRIDGE-TYPE MAGNETIC CIRCUIT
Filed Oct. 13, 1965    5 Sheets-Sheet 4
Fig. 7.
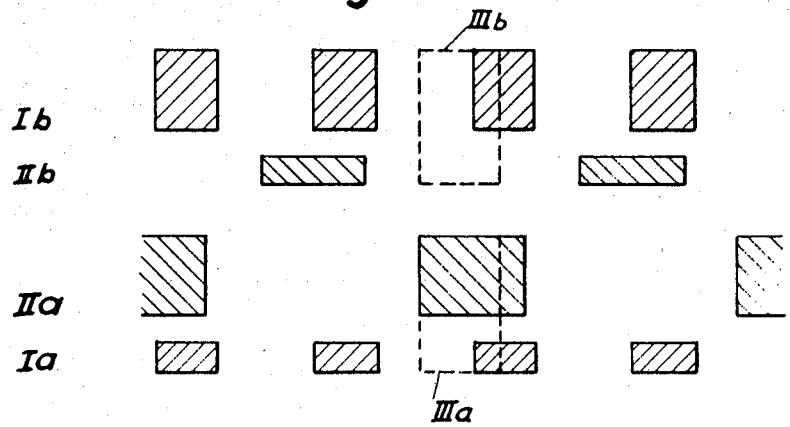
Fig. 8.
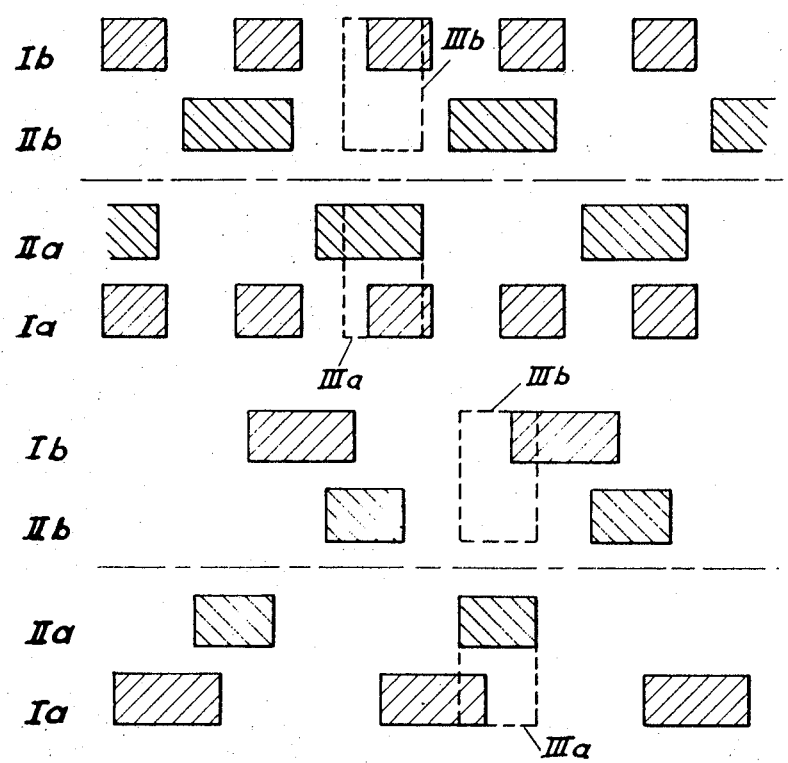
Fig. 9.
Inventor
Georges Stcherbatcheff
By Cushman, Darby & Cushman
Attorneys Sept. 23, 1969  G. STCHERBATCHEFF  3,469,133
ELECTRIC MOTOR WITH A BRIDGE-TYPE MAGNETIC CIRCUIT
Filed Oct. 13, 1965  5 Sheets-Sheet 5

Inventor
Georges Stcherbatcheff
By Cushman, Darby & Cushman
Attorneys

United States Patent Office 3,469,133
Patented Sept. 23, 1969

3,469,133
ELECTRIC MOTOR WITH A BRIDGE-TYPE
MAGNETIC CIRCUIT
Georges Stcherbatcheff, 29 Avenue La Bourdonnais,
Paris 7eme, France
Filed Oct. 13, 1965, Ser. No. 495,642
Int. Cl. H02k 21/04
U.S. Cl. 310—164
10 Claims

ABSTRACT OF THE DISCLOSURE

The invention broadly relates to electric synchronous motor having a permanently magnetized stator. The instant invention more particularly relates to a motor adapted for miniature construction, due to the use of a novel type of magnetic structure, wherein the moving armature includes an elongated core disposed along the axis of the coil and two pole-shoes, each of which forms two variable reluctance gaps with the salient stator poles.

---

The present invention relates to electric synchronous motors having a permanently magnetized rotor.

It is an object of the present invention to provide a synchronous motor of simple and dependable design which is adapted for miniature construction, while having a comparatively high torque and being capable of self-starting operation.

A synchronous motor generally includes a multi-polar field, an associated field coil for generating an alternating flux and a permanent magnet for providing an excitation flux. Various types of structures are known, which have all in common a number of disadvantages. In these prior art structures, the alternating flux generally passes through the magnet, which has a poor magnetic permeability, or through a number of parasitic air-gaps, and this highly increases the magnetic losses of the motor. Moreover, when only a small number of ampere-turns is available, which is the case for instance when the motor is used in a timing device, the excitation flux which may be effectively used in such structures, and consequently, the resulting torque, are comparatively small.

It is an object of the present invention to provide a synchronous motor in which the alternating flux path does not include any parasitic air-gap or low permeability portions, and in which a comparatively large excitation flux may be used, even when a small number of ampere turns is available in the field coil. Another object is to provide a synchronous motor in which a comparatively large excitation flux may be used, the field coil yet having a small internal cross-section and, therefore the resistive losses therein being small.

A further object is to provide a miniature synchronous motor adapted for being supplied with power in a very simple and economical fashion by means of a source of direct-current associated with means for chopping up the said current into pulses of constant sign. Still another object is to provide a miniature step-by-step motor which is self starting and adapted for being reliably controlled in a comparatively large number of positions of the rotor.

A feature of the invention is the provision of a synchronous motor including a novel type of magnetic structure, which will be termed hereinafter a "bridge-type" magnetic structure.

In accordance with the invention, a bridge-type magnetic circuit comprises: a stationary field comprising a coil and at least one permanent magnet having at least two pole-pieces surrounding the coil; a moving armature in the form of a core having the shape of an elongated member disposed along the axis of the coil and terminated by two pole shoes whereof each forms two gaps with the end faces of the respective pole-pieces.

The said pole shoes act as flux tappings, placing each end of the armature in communication with each pole of the magnet through the said gaps, which constitute four variable reluctances respectively forming the four arms of a bridge, the magnet thus being connected in one of the diagonals of the said bridge, and the armature in the other diagonal thereof.

In such a bridge-type magnetic structure, the transformation of electrical energy into mechanical energy originates from the variations in reluctance of the four arms of the bridge.

According to a further feature of the invention these reluctance variations result from the rotation of the armature about its axis, the pole-pieces of the field and the pole shoes of the armature being so cut out as to form two pairs of set of salient poles, each pair forming two equal variable reluctances in phase opposition to one another.

These and other objects, advantages and features of the invention will become clearly apparent with the aid of the following description.

In the appended drawings:

FIGURE 3 is a view from above of a synchronous miniature motor according to a preferred embodiment of the invention, which

FIGURE 5 is a partial view from above of the motor of FIGURES 3 and 4, the external part of the field being cut away;

FIGURE 6 illustrates the static behavior cycle of a synchronous motor according to the invention;

FIGURE 7 is a diagram intended to illustrate an embodiment of the salient pole faces comprised in the field of a synchronous motor according to the invention;

FIGURE 8 illustrates a second embodiment of the said salient pole faces;

FIGURE 9 illustrates a third embodiment of the said sets;

Figure 1:
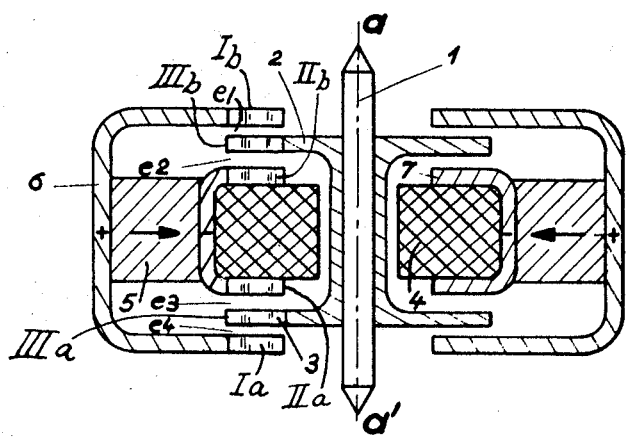
FIGURE 1 is a diagram which illustrates the principle of operation of a motor built in accordance with the invention.

The mechanical configurations for various motors embodying the teachings of the present invention are varied. However, the basic operation of the said motors will be clearly understood with consideration to the diagrammatical structure shown in FIGURE 1. The said structure comprises a moving armature 1 and a fixed field made up of a coil 4, a permanent magnet 5 and two pole-pieces 6 and 7 of permeable material.

These various components are preferably shaped as members of revolution about the axis aa' of the armature.

The magnet 5 is annular, and radially polarised.

The armature comprises an elongated narrow member which passes through the coil, terminated by two pole-shoes 2 and 3. The latter form, with respect to the magnetic flux, screens in the gaps bounded by the pole-pieces 6 and 7, which are in contact with the respective poles of the magnet, and whereof the cross-section is preferably, but not necessarily, folded in the shape of a C.

The armature may be considered to form a flux-receiver of substantially zero internal reluctance. Each of its ends is connected to each of the poles of the magnet by way of the gaps $e1, e2, e3, e4$.

The magnet constitutes a source of flux. An analogy may be made between such a magnetic circuit and the electrical bridge of FIGURE 2: S is a soruce of electrical voltage, I is a receiver (a galvanometer for example); E1, E2, E3 and E4 are resistances respectively proportional to the reluctances of the gaps $e1, e2, e3$ and $e4$. For reasons of symmetry, it is clear that no current will flow through I when the tappings P1 and P2, which are rigidly linked to one another, are at the middle of the resistances. However, when the tappings are displaced, it results an instantaneous current variation in I, which equals twice the current delivered by S.

Figure 2:
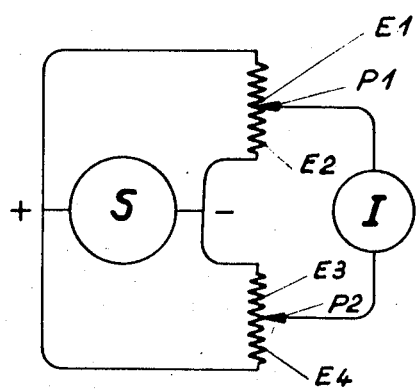
FIGURE 2 shows a bridge-type electrical circuit with which an analogy is made in order to explain the said principle of operation.

It is clear that the structure of FIGURE 1 will be the magnetic equivalent of the electric bridge of FIGURE 2, provided that the law of variations of reluctances of the gaps $e1, e2, e3$ and $e4$ should conform to the law of variation of the respective resistances E1 to E4, i.e. that the reluctances of $e1$ and $e2$ on one hand, $e3$ and $e4$ on the other hand should vary in phase opposition as the pole shoes 2 and 3 rotate about axis $aa'$. It will be shown hereinafter that such a law of variation is obtained, in the practical embodiments which are disclosed, through a particular construction of the stator, which includes two pairs of salient stator poles conveniently positioned around axis $aa'$. More precisely, one pair consists of the sets of sailent stator poles (I$a$–I$b$, FIGURE 1) which are of positive polarity, whereas the other pair consists of the sets of salient stator poles (II$a$–II$b$, FIGURE 1) which are of negative polarity. The rotor also includes two pairs of salient poles (III$a$–III$b$, FIGURE 1). Preferred embodiments of the relative dimensions and of the distribution of the two pairs of sets of salient stator poles are illustrated in FIGURES 5 and 7 to 9 and will be discussed more in detail hereinafter.

In brief, as the rotor salient poles of set III$a$ are displaced from a position where they are centered opposite the stator poles of set II$a$ for instance, the reluctance of the corresponding air-gap $e3$ for instance increases, while, at the same time, the reluctance of the air-gap $e4$ decreases. In the same manner, the reluctances of the air-gaps $e1$ and $e2$ vary in opposite directions, one being minimum when the other is maximum, and this is what is meant by saying that the pole sets I$b$ and II$a$ are set in "phase opposition." On the contrary, the pole sets I$a$ and II$b$ are set "in phase," which means that the reluctances $e4$ and $e2$ vary in the same direction.

It may be shown that, when the law of variation of the reluctances of the respective air-gaps conforms to the above conditions, the permanent magnet flux passing through the armature (1–2–3, FIGURE 1) is zero for a predetermined "median" position of the rotor, whereas the flux variation, as the armature rotates about axis $aa'$, is about twice the flux generated by the magnet.

It is to be understood that the analogy between the "magnetic bridge structure" which is illustrated in FIGURE 1 and the electrical bridge of FIGURE 2 in no way lays claim to giving a strict explanation of the properties of the said structure.

Such a structure finally has the remarkable feature that the core of the armature transmits only variable fluxes the sign of which is periodically reversed as the armature cyclically moves, the said variable fluxes being unexpectedly high for a given magnet volume.

As the core of the armature transmits only a variable flux which is useful in generating motion thereof, and as both the path of the excitation flux and the path of the alternating flux do not include any low permeability portion, it results, on one hand, that the efficiency of the motor will be particularly high even though the speed of revolution of the rotor be low and, on the other hand, that the cross-section of the core may be comparatively small. It finally results that it is possible to devise, starting from a "bridge type magnetic structure," highly efficient electric motors wherein the internal cross-section of the coil and, consequently, the resistive losses thereof, will be much smaller than in a conventional electric motor.

The said motors will have a very low power consumption and be particularly adapted for use as micromotors.

Figure 3:
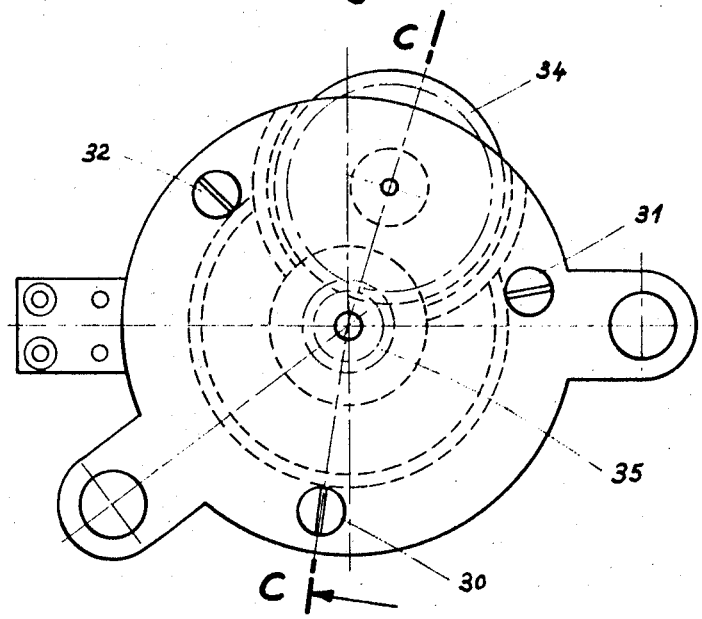
Figure 4:
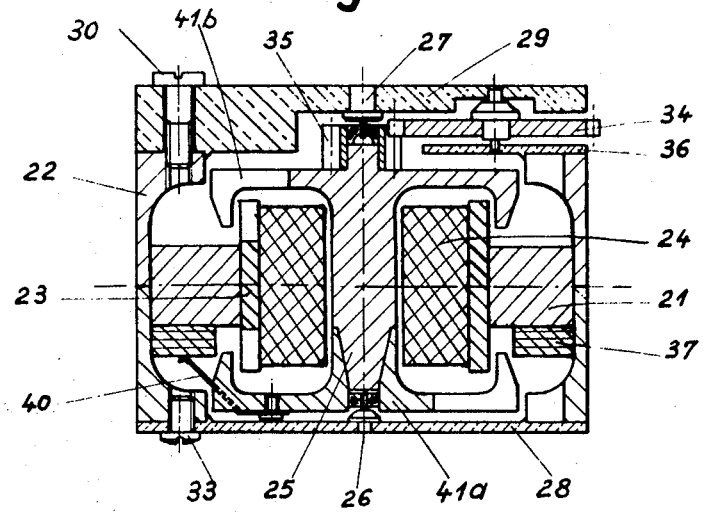
FIGURE 4 shows in section along CC in FIGURE 3.

A direct-current miniature motor including a "bridge-type magnetic structure" is illustrated in FIGURES 3 to 5. It comprises a field including a radially polarised annular ferrite magnet 21 mounted between two pole pieces 22 and 23 of soft magnetic alloy, shaped as bodies of revolution about the motor axis. The external piece 22 is of C-section, whereas the internal piece 23 is annular.

A coil 24 is accommodated in the pole-piece 23. The armature 25 is mounted on two pivots 26–27 supported by two plates 28–29 respectively fixed to the pole-piece 22 by screws such as 30 to 33.

A pinion 34, which meshes with a toothed wheel 35 carried by the spindle 25, pivots between the upper plate 29 and a bridge 36 fitted on to a projection on the piece 22.

A printed circuit 37, secured to one face of the magnet 21 and having for example the shape partially depicted in FIGURE 5, wherein the spotted portions 38 symbolise a metallic coating on an insulating base 39, co-operates with a brush 40 driven by the armature to make up a commutator. By means of connections not shown, this commutator enables the coil to be supplied with direct current from two batteries.

It will be seen in the view from below (FIGURE 5) that each of the pole-shoes, 41$a$ or 41$b$, of the armature 25 is so cut out as to form a 10-armed star, each arm of which constitutes one salient pole face of the rotor.

These two star-shaped sets of salient stator poles are set in phase opposition as will be explained hereinafter. The end faces of the internal pole-piece 23 of the stator, are likewise constituting 10 salient pole faces or teeth of the stator at each end thereof, these two sets of teeth being set in phase.

Finally, the end faces of the external pole-piece 22 of the stator (stator poles) are equipped with 20 teeth, these two sets of teeth being set in phase.

If the pairs of sets of teeth on the pieces 22, 23, 41$a$ and 41$b$ are respectively designated by I$a$–I$b$, II$a$ and III$a$–III$b$, it will be seen that I$a$ and I$b$ are in phase, that is to say that these two sets of teeth may become superimposed by translation parallel to the axis $aa'$; II$a$ and II$b$ are likewise in phase; III$a$ is in phase opposition to III$b$, that is to say that these two sets of teeth can become superimposed by translation parallel to $aa'$ accompanied by rotation through 180°/N of one of the two parts about $aa'$ (in the non-limitative example being described $N=10$).

It follows from this arrangement that the rotation of the rotor through a step corresponding to $1/2N$ of a complete revolution about $aa'$ reverses the flux passing into the core 25.

The motor operates as disclosed hereinabove with reference to FIGURES 1 and 2, in that the rotation of the rotor entails reluctance variations in the respective gaps, and, consequently a flux variation during each of the steps of rotation. It may be shown that there result variations in the torque C0 of the motor which prevails at zero current and in the torque C1 of the motor which prevails when the coil is energized, and which is proportional to the current.

A more detailed analysis shows that in general in such a rotary motor, the law of variation of C0 as a function of the angle $\theta$ of rotation of the rotor is periodic, with a frequency of 2N, while C1 varies periodically at a frequency of N. These laws of variation are illustrated in FIGURE 6.

It results that the motor, when at rest, 2N positions of stable balance and 2N positions of unstable balance per revolution.

The applicant has discovered that it is possible for a rotary motor according to the invention to be so constructed that the total torque $C0+C1$ is of constant sign and of an amplitude which varies but little within a half-cycle, $C1$ being generated from a substantially constant current; more precisely, the applicant has discovered that this last condition is best attained if the law by which the torque $(C0+C1)$ varies is proportional to $$2 \sin N_0 + \cos 2N_0$$

(the zeroes of $C1$ then coincide with the maxima of $C0$). Such a law will be termed hereinafter the "optimum law."

In practice, the optimum law will be attained through properly dimensioning and positioning the salient rotor and stator poles, as will be discussed hereinafter with reference to FIGURES 7–9. The specific design of the poles will depend on the mode of energization of the coil and of the type of application for which the motor is destined.

The motor normally is energized from a square wave current which has successively positive and negative polarities. In the embodiment disclosed in FIGURE 5, the said current is supplied by means of two batteries and through a commutator.

The commutator will be omitted when the coil is to be energized from an alternating current source. The motor will then work as an alternating current synchronous motor having the remarkable feature of delivering a good torque for any position of the rotor: therefore, the motor will be self-starting any of the said positions.

The applicant has discovered that it is also possible to make the motor work by supplying it with a pulsed current of constant polarity, provided that the bridge-type magnetic structure will then be asymmetrical, i.e. the conformation and reluctance variations of the excitation flux path at the respective ends of the core will be different. The torque at rest then takes the form of $$C0 = -2 \sin N_0 + \cos 2N_0$$

and the current, acting during a half-cycle, generates a torque of $C1 = 4 \sin N_0$, i.e. twice that required when the motor operates with a symmetrical excitation flux path. During the second half-cycle, the motor is driven by the sole torque $C0$.

One practical embodiment of a stator imparting the asymmetry to the excitation flux which is necessary for this type of operation will be disclosed hereinafter with reference to FIGURE 7.

An important advantage of this type of operation is that it enables one to devise a synchronous motor supplied from a single battery, associated with a conventional transistor chopper for providing direct-current pulses of constant polarity.

The manner according to which the above defined "optimum law" may be attained in practice will now be discussed more in detail.

In general, by assimilating the periodical laws of permeance of the magnetic structure to their first two harmonics (i.e. a constant term or fundamental, a term at a frequency of N or first harmonic and a term at a frequency of 2N or second harmonic), the applicant has been able to show that the optimum law may be obtained by any process which suitably alters the phase of the 2nd harmonic with respect to the fundamental.

A first process which is comparatively difficult to put in practice consists in designing sets of teeth of asymmetrical shape, the teeth being for instance wider at one end of the armature than at the other. The said process is illustrated in FIGURE 7.

A second process which is illustrated in FIGURES 5 and 8 and which is simpler consists in providing a pair of stator poles in whole or in part with at least one set of teeth ($Ia$, $Ib$, FIGURE 8) having a pitch of 2N, while the rotor and the other sets of teeth on the stator have a pitch of N; the set of teeth with a pitch of 2N will increase the relative amplitude of the second harmonic and a suitable setting of the said set of teeth will finally enable one to attain the optimum law.

Figure 10:
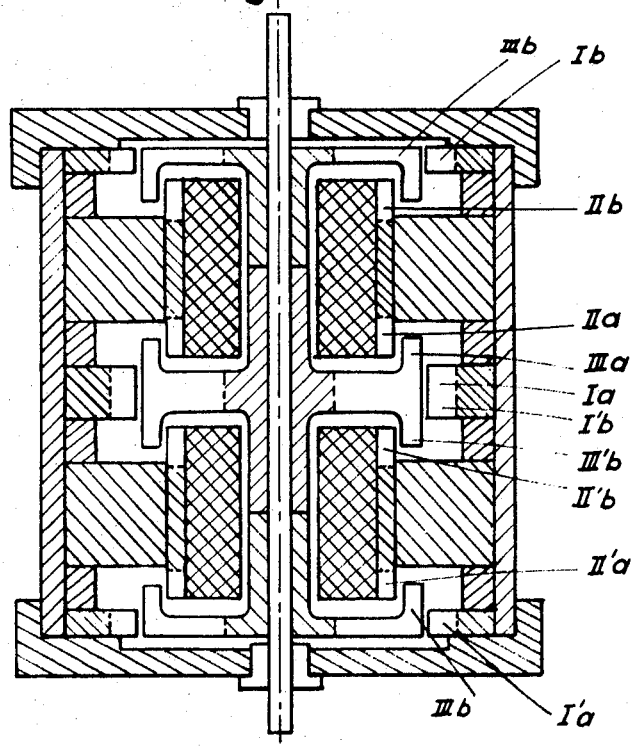
FIGURE 10 is an axial section taken through a motor according to the invention, more particularly adapted for being energized by a two-phase alternating current.

A third process, which is illustrated by FIGURE 10, is based on the applicant's discovery that the association of a pair of sets of poles having comparatively "wide" teeth with a pair of sets of poles having comparatively "narrow," teeth will give the optimum law for a definite relative setting "phase-shift" of these two pairs.

The second process is illustrated by FIGURE 5 in which it appears that one of the pairs of sets of teeth on the stator is at twice the frequency of the other sets of teeth on the stator and on the rotor.

FIGURE 8 is a diagrammatic developed view of the two pairs of sets of teeth on the stator according to the embodiment of FIGURE 5.

One tooth of each of the two sets of teeth on the rotor is shown in dotted line.

Each set of teeth is designated by one of the reference symbols already mentioned which indicate its position, and diagrammatically ilustrated as a series of hatched rectangles which correspond to the poles on the stator, that is to say to the end faces of the pole-pieces of the magnet. It will be seen that $Ia$ and $Ib$ on the one hand, and $IIa$ and $IIb$ on the other hand, are symmetrical with respect to a plane perpendicular to the axis of the motor (except for phase-shift as regards $IIa$ and $IIb$).

The third process is illustrated by FIGURE 9. The sets of teeth $Ia$ and $Ib$ have "wider" poles than the sets of the teeth $IIa$ and $IIb$, but except for phase-shift all the sets of teeth are symmetrical with respect to a plane perpendicular to the axis of the motor.

When asymmetry of excitation flux is to be provided, in conformity with the first process mentioned hereinabove, the sets of teeth which are shown in FIGURE 7 will advantageously be used.

In FIGURE 7, the sets of teeth corresponding to poles of the same sign are asymmetrical; for the pair of pole sets $Ia$–$Ib$ the teeth of large surface area are at the top ($Ib$), while for the pairs of pole sets $IIa$–$IIb$ the teeth of large surface area are at the bottom ($IIa$).

The motor corresponding to this embodiment will be supplied with direct current chopped up into pulses of constant sign.

By way of a variant, the asymmetry of the excitation flux may be produced by staggering the position of the armature upwards or downwards with respect to the plane of symmetry perpendicular to the axis of the motor.

By way of a variant of the motor in FIGURES 3 to 5, it would be possible (FIGURE 10) to group two co-axially disposed bridge-type magnetic structures on the same shaft, each having the general structure described and depicted in FIGURES 3 to 5. Naturally, in this case the sets of teeth $Ia$ and $I'b$ are carried by a single piece, and the same applies to the sets of teeth $IIIa$ and $III'b$. Moreover, such a motor comprises symmetrical sets of teeth of identical frequency for the rotor and the stator.

The sets of teeth which concern a given part of the rotor are in phase opposition (i.e. $Ib$ and $IIb$, $Ia$ and $IIa$, $I'a$ and $II'a$).

Morevore, the pair $Ib$–$IIb$ has a phase lead of 90° with respect to the pair $IIa$–$Ia$, and the pair $II'a$–$I'a$ has a phase lag of 90° with respect to the pair $IIa$–$Ia$. For a given current, the torque laws relating to the two coils are thus phase-shifted through 90°.

In the version depicted in FIGURE 10, the motor is supplied with two-phase alternating current, the phase-shift being produced in conventional fashion by a condenser.

The addition of two printed-circuit commutators set at 90°, such as those hereinbefore described, allows for running on direct current, the direction being reversed when the sign of the current is reversed.

Figure 11:
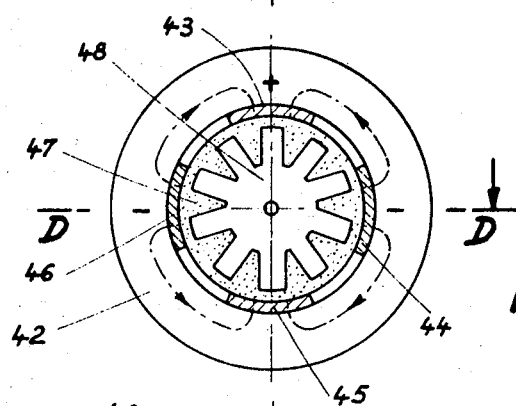
FIGURE 11 is a partial view taken in section along EE in FIGURE 10, of another embodiment of a synchronous motor in accordance with the invention.
Figure 12:
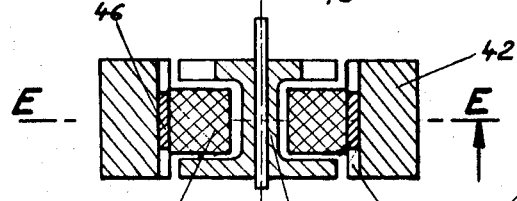
FIGURE 12 is a sectional view taken along DD in FIGURE 11.

FIGURES 11 and 12 depict a rotary motor comprising an annular magnet 42 having four internal poles, as shown by the lines of force of the magnetic field depicted in FIGURE 11.

The four pole-pieces of this magnet are cemented, and are in the shape of segments 43 to 46 having rectangular teeth (not shown) at their ends.

An annular coil 47 is disposed between the magnet 42 and a rotor 48 whereof each pole-shoe comprises 10 arms.

In the non-limitative embodiment shown, the arrangement is such that the positive and negative sets of teeth on each of the end faces of the stator are in phase opposition.

Moreover, the teeth of the two pole-shoes of the rotor are set at such an angle, which nearly corresponds to phase opposition, that the optimum law already defined is attained.

The manner in which this motor works is identical with that in the foregoing figures.

Another embodiment, not shown, of the motor according to the invention would reside in further reducing the diameter by replacing the central radially polarised magnet by two axially polarised magnets disposed on either side of the coil.

It is to be understood that numerous practical details of the embodiments described and depicted may vary without departing from the limits of the invention.

What is claimed is:

1. An electric motor device having
   a rotatable armature having an axis of rotation and a stationary field disposed about said armature,
   said field including at least one permanent magnet having at least outer and inner pole pieces of opposite magnetic polarity,
   said outer pole piece forming at least first and second spaced sets (Ia and Ib) of adjacent salient stator poles,
   said inner pole piece forming at least first and second spaced sets (IIa and IIb) of adjacent salient stator poles,
   said field further including at least one energizing coil having an axis,
   said armature being shaped as an elongated core member mounted so that said rotation axis coincides with the axis of said coil and forming at least first and second spaced sets (IIIa and IIIb) of adjacent salient rotor poles,
   said first and second sets (IIIa and IIIb) of rotor poles being disposed to cooperate respectively with said first (Ia and IIa) and second (IIa and IIb) of stator pole of each pole piece, the first (Ia) and second (Ib) sets of adjacent salient stator poles of said outer pole piece being substantially set in phase opposition respectively with the first (IIa) and second (IIb) sets of adjacent salient stator poles of the inner pole piece whereas the first (IIIa) and second (IIIb) set of adjacent salient rotor poles are set in a phase relationship opposite to the phase relationship of the first (IIa) and second (IIb) sets of stator poles on the inner pole piece, one of said phase relationships being phase opposition while the other is an in phase relationship.

2. An electric motor device according to claim 1, wherein said salient rotor and stator poles are regularly distributed about said axis, at least part of said salient stator poles having a distribution pitch which is half that of the salient rotor poles.

3. An electric motor device according to claim 1, wherein said salient rotor and stator poles are regularly distributed about said axis, the salient stator and rotor poles having the same pitch and the salient stator poles of one of the pole pieces having a width which is substantially different from that of the salient stator poles of the other pole piece.

4. An electric motor device as claimed in claim 1, wherein said salient rotor and stator poles are regularly distributed about said axis, wherein the salient stator poles of the first set of one of the said pole pieces have a substantially smaller area than the salient stator poles of the second set of the said pole piece, whereas the salient stator poles of the first set of the other pole piece have a substantially larger area than the salient stator poles of the second set of the said other pole piece.

5. An electric motor device as claimed in claim 1, wherein the said permanent magnet is shaped as a ring centered on the said axis, and is magnetized with at least four internal poles on the inner wall thereof, at least two pairs of pole pieces of opposite polarity being distributed along said inner wall.

6. An electric motor device according to claim 1, the armature of said motor device including first and second pole-shoes at the respective ends thereof and third and fourth pole-shoes in the centre part thereof, the field of said motor including a first coil and a first annular radially polarised magnet having two pole pieces and a second coil and a second annular radially polarised magnet having two pole pieces, each of said pole-shoes and each of said pole pieces being provided with sets of salient poles.

7. An electric motor device according to claim 1, wherein the salient stator and rotor poles are dimensioned and positioned so as to provide a law of variation of the motor torque as a function of the angular position of the armature about the said axis, such that the motor torque at zero current is substantially maximum and of constant sign for each of the armature angular positions for which the torque proportional to the current cancels out.

8. An electric motor device as in claim 1 wherein each of said pole pieces and each of said rotor and stator pole sets is annular.

9. An electric motor device as in claim 1 wherein said first and second rotor pole sets (IIIa and IIIb) are in phase and the first and second stator pole sets (IIa and IIb) of said inner pole piece are in phase opposition.

10. An electric motor device as in claim 1 wherein said first and second rotor pole sets (IIIa and IIIb) are in phase opposition and the first and second stator pole sets (IIa and IIb) of said inner pole piece are in phase.

References Cited

UNITED STATES PATENTS

| 2,447,230 | 8/1948 | Brown | 310—34 |
| 2,796,571 | 6/1957 | Dunn | 310—164 |
| 3,059,131 | 10/1962 | Everard et al. | 310—164 |
| 3,092,743 | 6/1963 | Van Utt et al. | 310—164 |
| 3,130,334 | 4/1964 | Nowak | 310—35 |
| 3,149,255 | 9/1964 | Trench | 310—30 |
| 3,307,056 | 2/1967 | Woolley | 310—164 |
| 3,322,987 | 5/1967 | Kohlhagen | 310—164 |

MILTON O. HIRSHFIELD, Primary Examiner

L. L. SMITH, Assistant Examiner

U.S. Cl. X.R.

310—34